United States Patent
Liu

(10) Patent No.: US 6,787,079 B2
(45) Date of Patent: Sep. 7, 2004

(54) METHOD FOR MAKING A MULTI-LAYER EXPANDED SHOE SOLE

(76) Inventor: Kun-Chung Liu, No. 5, Alley 9, Lane 212, San-Feng Rd., Hou-Li Hsiang, Taichung Hsien (TW)

( * ) Notice: Subject to any disclaimer, the term of this patent is extended or adjusted under 35 U.S.C. 154(b) by 141 days.

(21) Appl. No.: 10/213,869

(22) Filed: Aug. 5, 2002

(65) Prior Publication Data

US 2004/0021242 A1 Feb. 5, 2004

(51) Int. Cl.$^7$ .............................................. B29C 44/06
(52) U.S. Cl. ....................... 264/46.4; 156/79; 264/45.1; 264/51
(58) Field of Search .................. 156/79; 264/45.1, 264/46.4, 51

(56) References Cited

U.S. PATENT DOCUMENTS

| | | | | |
|---|---|---|---|---|
| 5,141,578 A | * | 8/1992 | Yang | ........................... 156/79 |
| 5,308,420 A | * | 5/1994 | Yang | ........................... 156/79 |
| 5,318,645 A | * | 6/1994 | Yang | ........................... 156/79 |
| 5,972,257 A | * | 10/1999 | Liu | ........................... 264/40.4 |
| 6,129,798 A | * | 10/2000 | Yang | ........................... 156/79 |
| 6,238,602 B1 | * | 5/2001 | Liu | ........................... 264/40.1 |

* cited by examiner

Primary Examiner—Allan R. Kuhns
(74) Attorney, Agent, or Firm—Knobbe, Martens, Olson & Bear, LLP

(57) ABSTRACT

A method for making a multi-layer expanded shoe sole includes the steps of (a) molding a first foamable material to form a first unexpanded blank and cooling the first unexpanded blank to a low temperature to harden the first unexpanded blank, (b) molding a second foamable material to form a second unexpanded blank and maintaining the second unexpanded blank at a high temperature such that the second unexpanded blank is in a softened state, and (c) stacking and thermal molding the first and second unexpanded blanks in a mold at a molding temperature to permit the first and second unexpanded blanks to undergo a reaction for cross-linking and expansion.

2 Claims, 6 Drawing Sheets

METHOD FOR MAKING A MULTI-LAYER EXPANDED SHOE SOLE

BACKGROUND OF THE INVENTION

1. Field of the Invention

This invention relates to a method for making a multi-layer expanded shoe sole, more particularly to a method for making a multi-layer expanded shoe sole with a clear-cut boundary between two adjacent sole layers of the expanded shoe sole.

2. Description of the Related Art

A multi-layer shoe sole may be prepared by a conventional method involving the step of stacking and thermal molding hardened unexpanded blanks in a mold to permit the unexpanded blanks to undergo a reaction for cross-linking and expansion. However, the aforesaid method is disadvantageous in that adjacent hardened unexpanded blanks are required to have shapes which would substantially fit to each other in order to form the shoe sole with a clear-cut boundary between two adjacent sole layers of the shoe sole. As a consequence, arrangement and positioning of the adjacent hardened unexpanded blanks in the mold is inconvenient. Moreover, the bonding strength between the adjacent sole layers of the shoe sole tends to be relatively poor, and gaps may be formed between the adjacent sole layers of the shoe sole.

SUMMARY OF THE INVENTION

Therefore, the object of the present invention is to provide a method for making a multi-layer expanded shoe sole that is capable of overcoming the aforementioned drawbacks.

According to the present invention, a method for making a multi-layer expanded shoe sole comprises the steps of: (a) molding a first foamable material to form a first unexpanded blank, and cooling the first unexpanded blank to a low temperature to harden the first unexpanded blank; (b) molding a second foamable material to form a second unexpanded blank, and maintaining the second unexpanded blank at a high temperature such that the second unexpanded blank is in a softened state; and (c) stacking and thermal molding the first and second unexpanded blanks in a mold at a molding temperature to permit the first and second unexpanded blanks to undergo a reaction for cross-linking and expansion.

BRIEF DESCRIPTION OF THE DRAWINGS

In the drawings which illustrate an embodiment of the invention.

DETAILED DESCRIPTION OF THE PREFERRED EMBODIMENT

Figure 1:
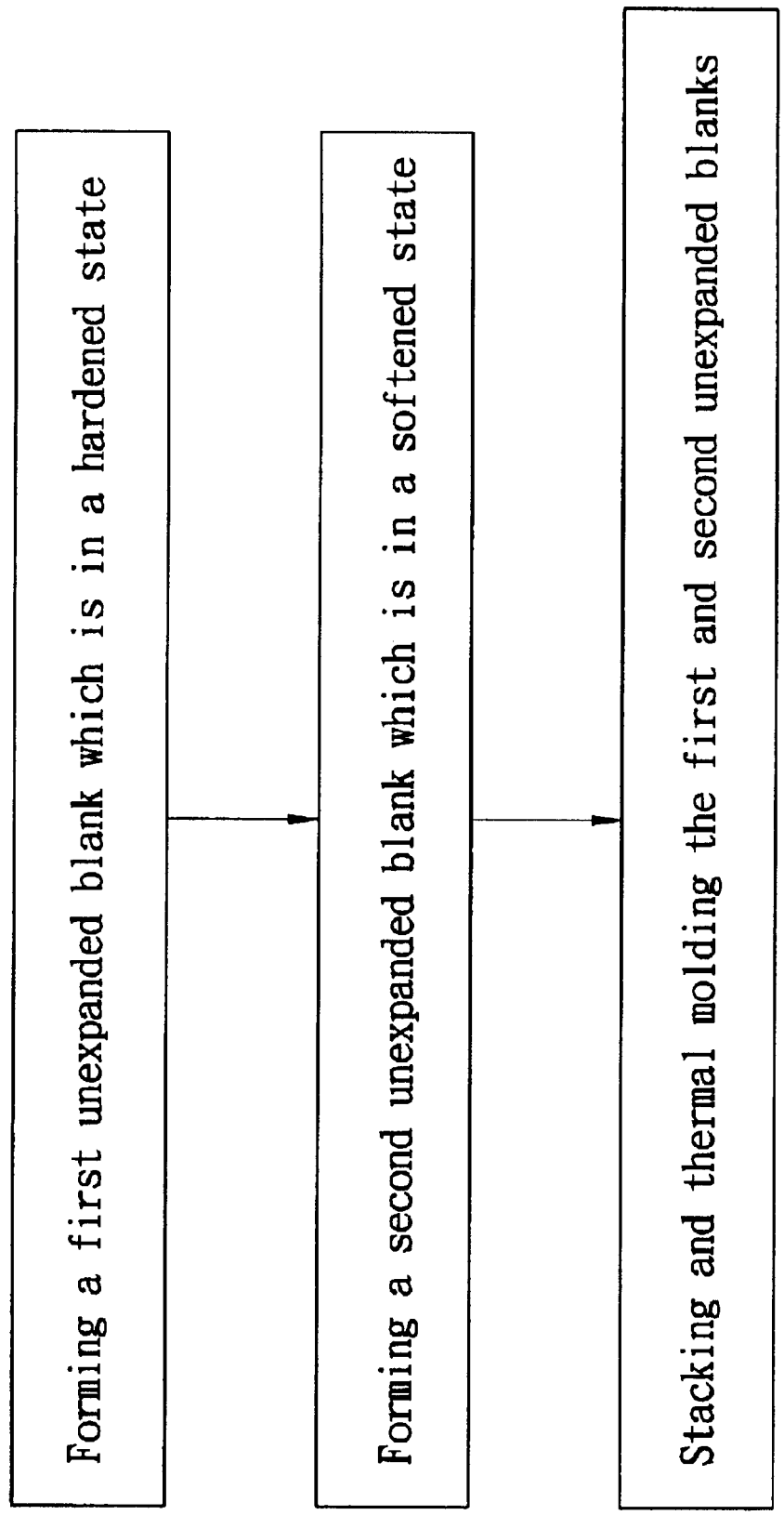
FIG. 1 is a flow diagram illustrating consecutive steps of a method embodying this invention for making a multi-layer expanded shoe sole.
Figure 4:
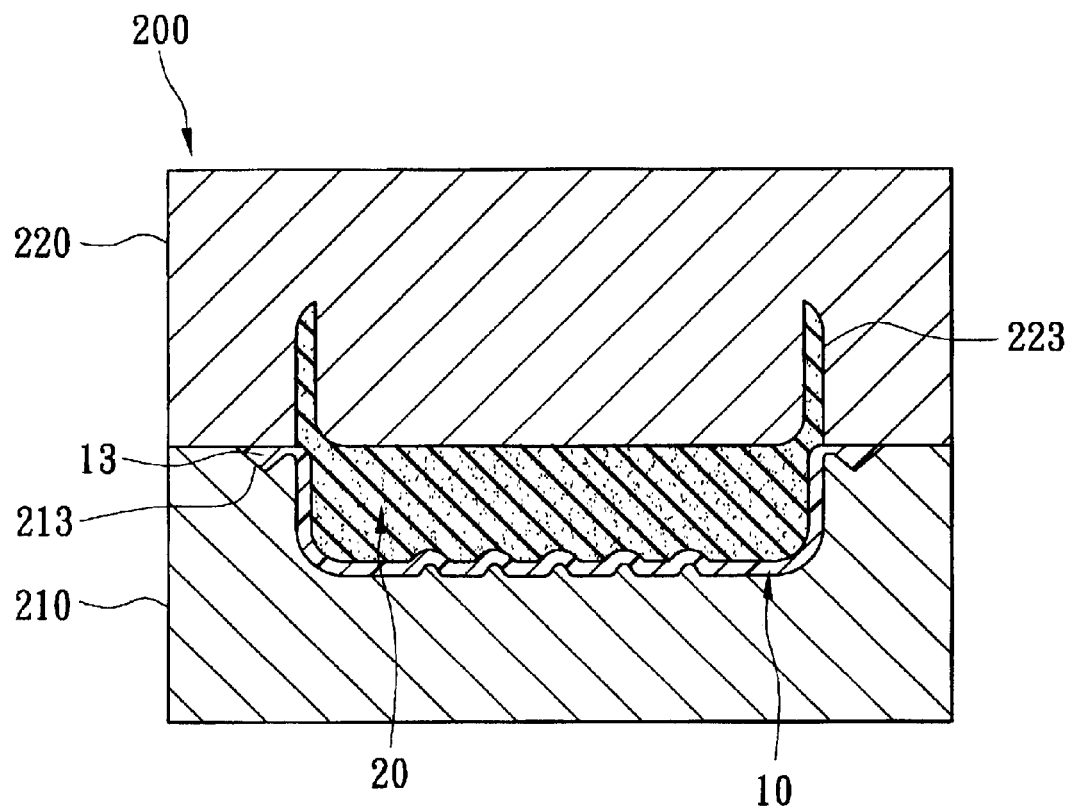
Figure 5:
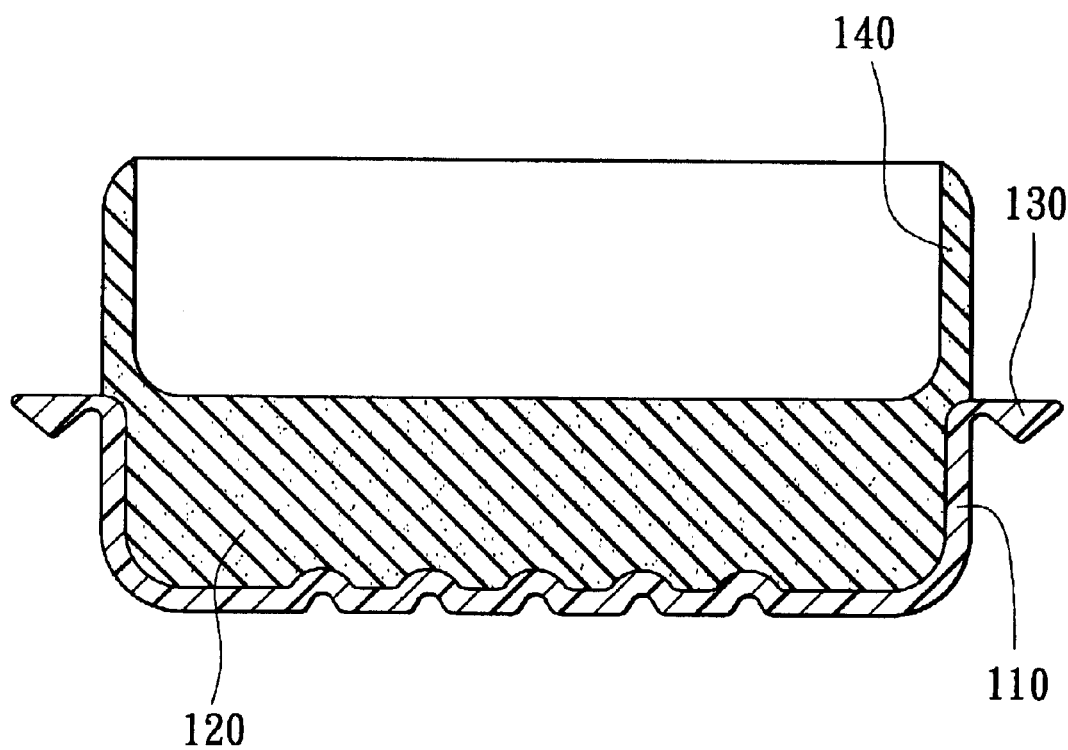
FIGS. 5 and 6 are sectional views of unfinished and finished multi-layer expanded shoe soles formed according to the method of this invention.
Figure 6:
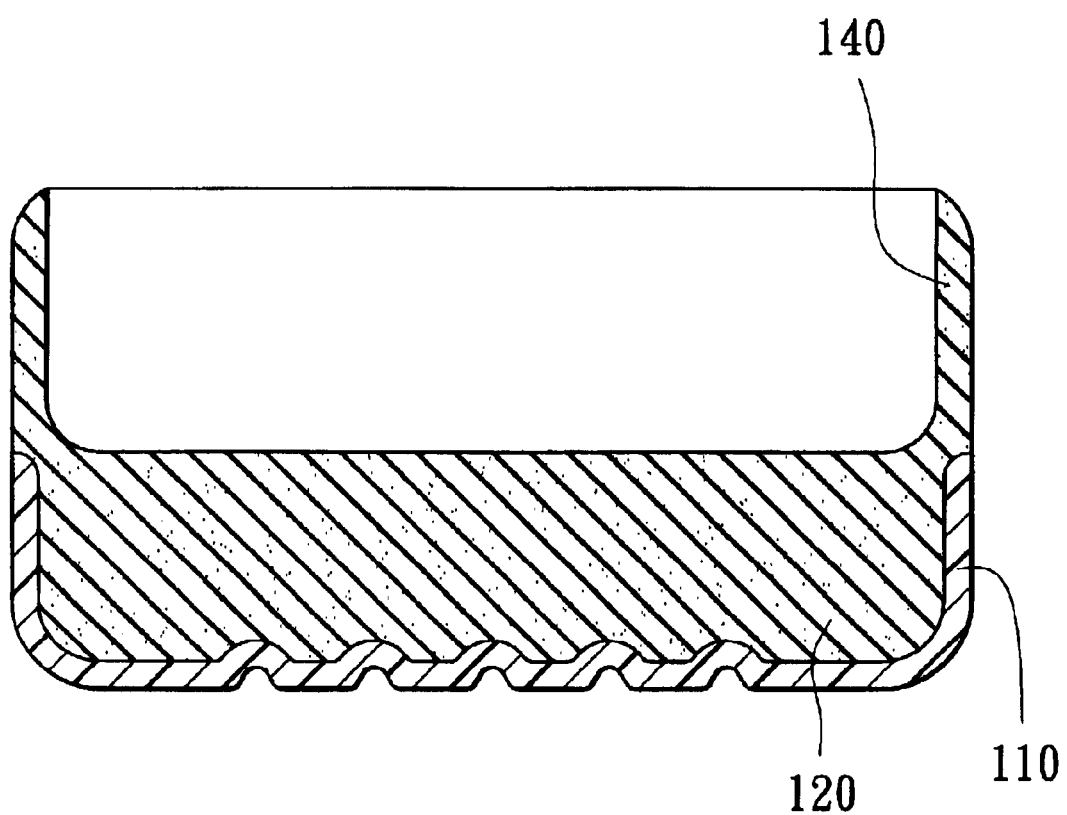

FIG. 1 shows consecutive steps of a method embodying this invention for making a multi-layer expanded shoe sole that includes an outer sole layer 110 and an inner sole layer 120 surrounded by the outer sole layer 110 (see FIGS. 5 and 6). The method includes the steps of: (a) molding a first foamable material to form a first unexpanded blank 10, and cooling the first unexpanded blank 10 to a low temperature to harden the first unexpanded blank 10; (b) molding a second foamable material to form a second unexpanded blank 20, and maintaining the second unexpanded blank 20 at a high temperature such that the second unexpanded blank 20 is in a softened state; and (c) stacking and thermal molding the first and second unexpanded blanks 10, 20 in a mold 200 (see FIGS. 2 to 4) at a molding temperature to permit the first and second unexpanded blanks 10, 20 to undergo a reaction for cross-linking and expansion and to be formed into the outer and inner sole layers 110, 120, respectively. The mold 200 includes complementary female and male mold halves 210, 220.

The first and second foamable materials are preferably made from a molding composition that contains ethylene-vinyl acetate copolymer (EVA). With EVA as the molding composition, the low temperature for the first unexpanded blank 10 is preferably set in a range of from room temperature to 50° C., the high temperature for the second unexpanded blank 20 is preferably set in a range of from 70 to 110° C., and the molding temperature for the mold 200 is preferably set in a range of from 150 to 180° C.

In this embodiment, the first unexpanded blank 10 has a peripheral wall 11 with a U-shaped cross-section that conforms to an inner wall 212 of the female mold half 210 of the mold 200. The second unexpanded blank 20 has a height greater than and a cross-section smaller than those of a recess 12 defined by the peripheral wall 11 of the first unexpanded blank 10, thus facilitating placement of the second unexpanded blank 20 in the recess 12. The aforesaid cross-section lies in a plane transverse to the height of the second unexpanded blank 20. Since the first unexpanded blank 10 is in a hardened state prior to the reaction, the shape thereof remains substantially the same during the aforesaid reaction, and since the second unexpanded blank 20 is in a softened state prior to the aforesaid reaction, shape of the second unexpanded blank 20 can be made to conform to the shape of the recess 12 in the first unexpanded blank 10 during the reaction, and a clear-cut boundary between the outer and inner sole layers 110, 120 can be achieved, thereby eliminating the aforesaid drawback as encountered in the prior art.

Figure 2:
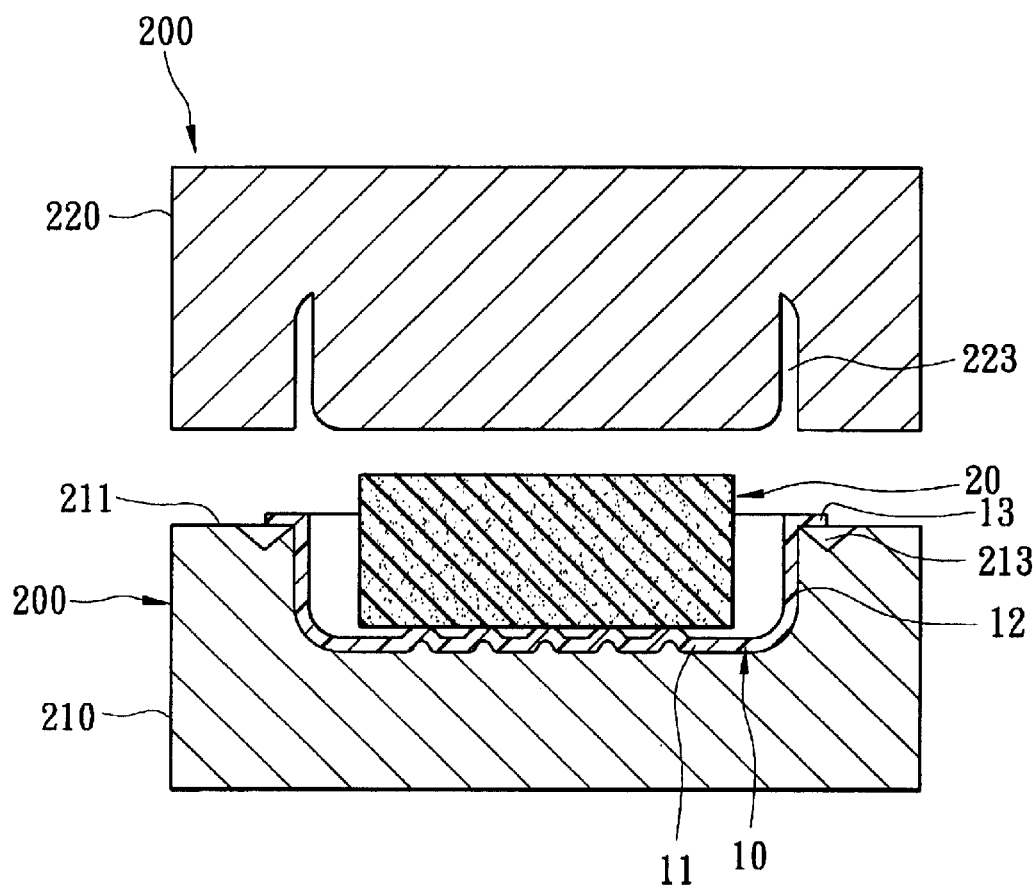
FIG. 2 is a sectional view to illustrate how the first and second unexpanded blanks are placed in a mold according to the method of this invention.
Figure 3:
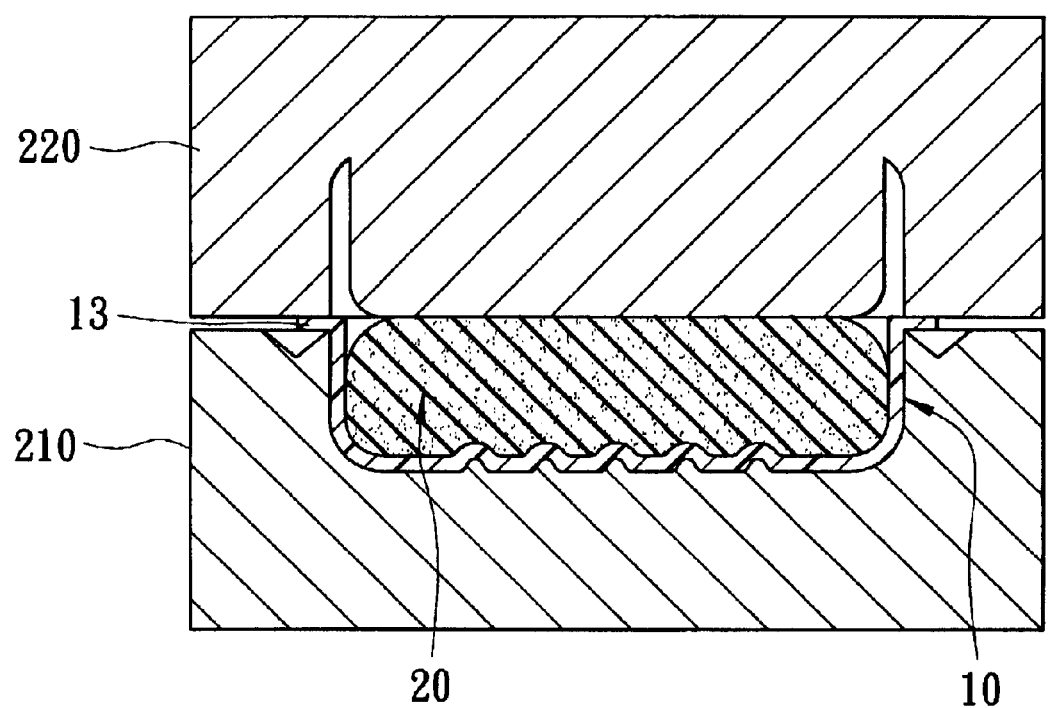
FIGS. 3 and 4 are sectional views to illustrate how the first and second unexpanded blanks are thermally pressed by the mold according to the method of this invention.

Referring to FIGS. 2 to 4, the first unexpanded blank 10 is formed with a flange 13 that radially and outwardly extends from a top end of the peripheral wall 11 and that is seated on an upper surface 211 of the female mold half 210 adjacent to a groove 213 formed in the upper surface 211 of the female mold half 210 so as to enhance sealing effect between the female and male mold halves 210, 220 during the aforesaid reaction. The flange 13 of the first unexpanded blank 10 results in a flange 130 of the outer sole layer 110 in the groove 213 (see FIGS. 4 and 5). The flange 130 is subsequently trimmed from the outer sole layer 110 to form the final product of the shoe sole of this invention (see FIG. 6).

The male mold half 220 is formed with a groove 223 so as to permit forming of a flange 140 on a top end of the inner sole layer 120.

With the invention thus explained, it is apparent that various modifications and variations can be made without departing from the spirit of the present invention. It is therefore intended that the invention be limited only as recited in the appended claims.

I claim:

1. A method for making a multi-layer expanded shoe sole, the method comprising the steps of:

(a) molding a first foamable material to form a first unexpanded blank, and cooling the first unexpanded blank to a low temperature to harden the first unexpanded blank, the first unexpanded blank being formed with a flange extending radially and outwardly from a top end of a peripheral wall of the first unexpanded blank;

(b) molding a second foamable material to form a second unexpanded blank, and maintaining the second unexpanded blank at a high temperature such that the second unexpanded blank is in a softened state; and (c) stacking and thermal molding the first and second unexpanded blanks in a mold at a molding temperature to permit the first and second unexpanded blanks to undergo a reaction for cross-linking and expansion;

wherein the low temperature is in a range of from room temperature to 50° C., the high temperature is in a range of from 70 to 110° C., and the molding temperature is in a range of from 150 to 180° C.; and wherein the mold includes complementary male and female mold halves, the flange of the first unexpanded blank being seated on an upper surface of the female mold half so as to enhance a sealing effect between the female and male mold halves during the aforesaid reaction for cross-linking and expansion.

2. The method of claim 1, wherein the first and second foamable materials are made from a molding composition that contains ethylene-vinyl acetate copolymer.

* * * * *